United States Patent
Bogue et al.

[15] 3,666,961
[45] May 30, 1972

[54] ELECTRICAL POWER SUPPLY

[72] Inventors: John C. Bogue, Santa Monica; Robert I. Sarbacher, Arcadia, both of Calif.

[73] Assignee: said Bogue, by said Sarbacher

[22] Filed: Nov. 24, 1969

[21] Appl. No.: 879,158

[52] U.S. Cl. .................................. 307/65, 320/39, 307/77
[51] Int. Cl. ........................................................ H02j 7/00
[58] Field of Search ................... 307/65, 77, 66; 320/39, 40, 320/46

[56] References Cited

UNITED STATES PATENTS

| | | | |
|---|---|---|---|
| 2,992,363 | 7/1961 | Granquist | 307/66 UX |
| 3,419,779 | 12/1968 | Zehner | 307/66 X |
| 3,441,802 | 4/1969 | Bradley | 307/65 |

*Primary Examiner*—Herman J. Hohauser
*Attorney*—Witherspoon and Lane

[57] ABSTRACT

An electrical power supply, particularly adapted for intermittent use, has an extremely long standby life. A series of squib actuated primary cell electrochemical reserve batteries are controlled by a selective activation circuit, so that each reserve battery of the series is activated only after the the preceeding battery has substantially spent its useful life. The circuit responds to a drop in battery output voltage signalling the end of the battery's useable life, to substitute the next battery in the series, and to activate it by firing its squib.

9 Claims, 1 Drawing Figure

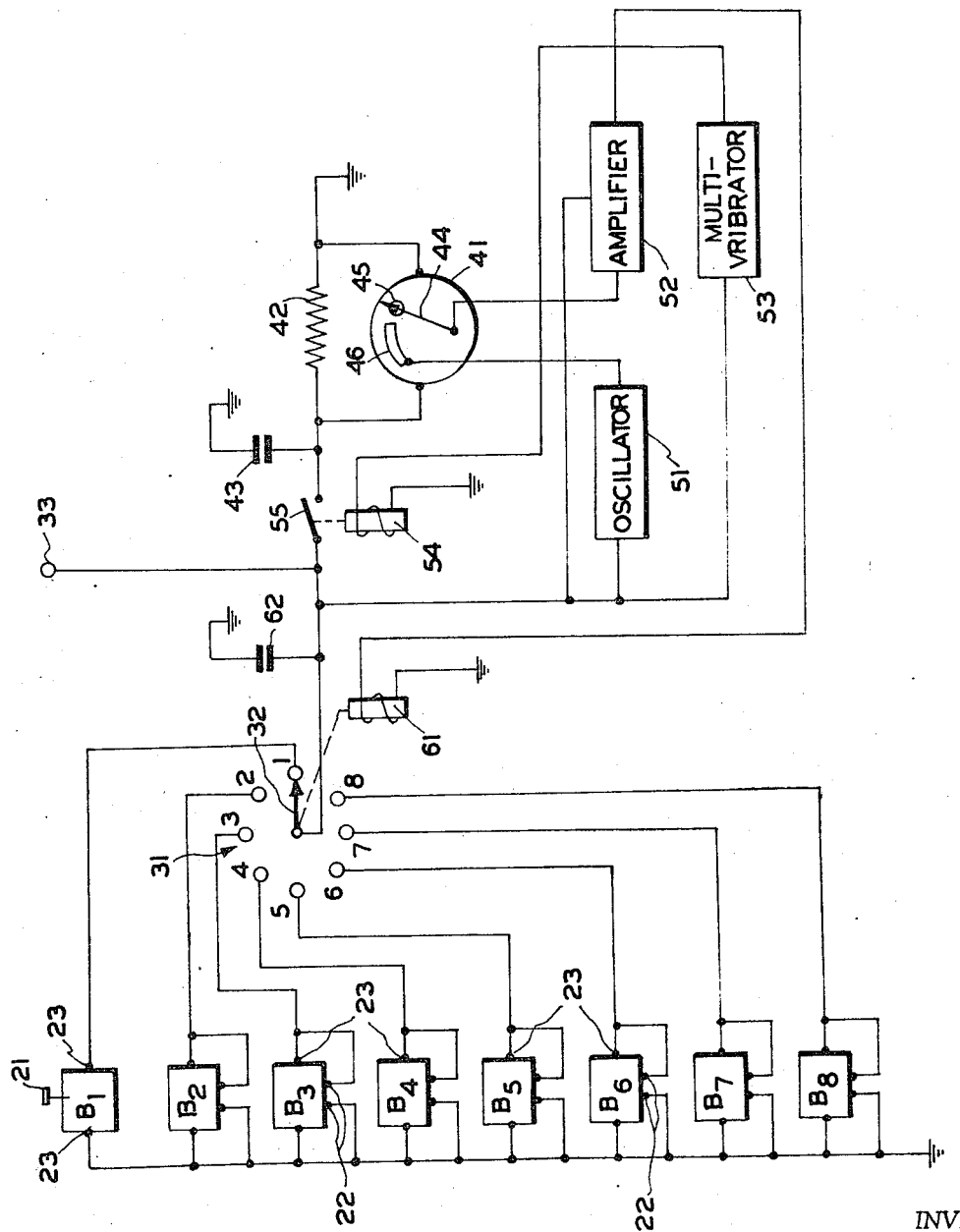

ELECTRICAL POWER SUPPLY

BACKGROUND OF INVENTION

There are a number of instances where a standby source of electrical power is needed, so that power is available where required, but where the total quantity of power required over a long period of time is not great. Further, installations requiring such power service are sometimes remote and not reasonably accessible. One such environment is underwater transponder sonobuoys utilized for navigational guidance purposes. The only practical method of powering the transponder circuitry of these buoys is by electrochemical batteries, and a significant limiting factor in the useful life of these devices is therefore the shelf and/or standby life of the battery power supply.

SUMMARY OF THE INVENTION

The present invention relates generally to battery power supplies, and more particularly it relates to such power supplies whose shelf life prior to activation is essentially unlimited, and whose standby life once activated is extremely long.

One aspect of the electrical power supply of the present invention is the use of reserve electrochemical primary cell batteries. Reserve primary cell batteries are known in the art. They are batteries wherein the electrodes are fully assembled for operation, but the electrolyte is held in reserve in a separate container within the battery housing. Since there is no consumption of the electrodes under these circumstances, the shelf life of the battery is essentially indefinite. However, once the electrolyte is released from its reserve container, such as by mechanical puncture, explosive squib rupture, or any other means as are well known in the art, the primary cell battery is activated, and thereafter has a limited standby life.

In accordance with present invention, a series of reserve primary cell batteries are employed in combination with a selective activation circuit. When all batteries of the system are in reserve status, the shelf life of the power supply is practically indefinite. However, once the first battery is activated, the standby life of the system is limited; but because of selective or controlled sequential activation of the series of batteries, an extremely long standby life is obtained. The total standby life of the power supply is a function of the standby characteristics of the individual batteries and the number of batteries in the series, and is the sum of the individual standby lives of all the batteries in the series.

A small portion of the energy of the activated battery is used to operate the selective activation circuit, which constantly monitors the output characteristics of this battery, particularly its output voltage. As the useful life of the activated battery nears its end, its output voltage drops and this occurence induces a response from the selective activation circuit, which substitutes the next battery in the series for the expended one, and actuates a squib or other device to release its electrolyte supply from reserve. Thus the next battery in the series is activated to provide the necessary electrical energy until its useful life approaches an end, whereupon the selective activation circuit substitutes the following battery in the series.

It is therefore one object of the present invention to provide an electrochemical power supply having an extremely long standby life.

Another object of the present invention is to provide for the selective activation of successive electrochemical primary reserve cell batteries, as the useful life of each battery is expended.

Other objects and advantages of the present invention will become apparent to those skilled in the art from a consideration of the following exemplary detailed description of one specific embodiment of the invention, had in conjunction with the accompanying drawing, which is a schematic circuit drawing of a battery power supply and a selective activation circuit embodying the principles of the present invention.

DETAILED DESCRIPTION OF INVENTION

A series of batteries B1 through B8 is shown in the drawing, and these are only schematically represented, because various structures therefor are well known in the art, and the details thereof are not material to the present invention. Each of these batteries is an electrochemical primary cell reserve battery. Battery B1 may be mechanically or manually activated, as suggested by the plunger 21. When plunger 21 is depressed, it punctures the electrolyte container in the battery housing, and thereby releases the electrolyte to the electrode compartment of the battery. The remaining reserve batteries B2 through B8 are activated by the firing of an electrically detonated small explosive squib within the battery casing. Thus, each of the latter batteries is provided with squib firing terminals indicated by the numeral 22. All of the batteries have the usual output terminals 23.

One output terminal of each battery is connected to a respective terminal on the rotary stepping switch 31, battery B1 being connected to switch terminal 1, battery B2 to switch terminal 2, etc. Thus, with the rotary switch contact 32 closed to terminal 1 as shown, battery B1 is connected to power output terminal 33. If the contact 32 were closed to terminal 2, battery B2 would be connected to the power output terminal, etc. In addition, switch 31 connects the selected battery to a battery output monitoring circuit and a selective activation circuit. In particular, the switch 31 connects the activated battery to the voltmeter 41, oscillator 51, amplifier 52, and multivibrator 53.

Assuming that battery B1 has been activated by depressing plunger 21, with the rotary switch contact 32 closed to terminal 1, power from the battery B1 is delivered to a load via output terminal 33; and at the same time, a small amount of the battery power is used to drive the multivibrator 53. The output of the multivibrator causes the relay 54 to oscillate therewith, and thereby to open and close switch 55 rapidly. When switch 55 is closed, a small portion of the output of battery B1 is applied to the meter 41 and to the integrating circuit composed of resistor 42 and capacitor 43 in parallel with the meter. Needle 44 of meter 41 therefore assumes a substantially steady position, such as shown in the drawing, in accordance with the electrical parameters of the circuit.

A small portion of power from battery B1 is also applied to oscillator 51 and is the supply voltage for amplifier 52. Voltmeter 41 is a capacitor switch meter, wherein the needle face 45 and stationary plate 46 function as capacitor plates. This meter capacitor forms the coupling between oscillator 51 and amplifier 52. When the meter needle 44 is in the position shown in the drawing, the battery B1 is operating at a useful power output, and there is essentially no coupling between the oscillator 51 and the amplifier 52. However, as the useful life of the battery B1 nears its end, the voltage of the battery drops, and meter needle 45 moves counterclockwise in the drawing, bringing the needle face 45 into juxtaposition with the plate 46. This action capacitively couples the output of oscillator 51 to the input of amplifier 52, and the resultant output of amplifier 52 energizes relay 61. Relay 61 is the driver for stepping switch 31, and therefore steps the rotary contact from terminal 1 to terminal 2. When this step is completed, the capacitor 62 is connected through switch terminal 2 to the squib terminals 22 of battery B2, and the charge on this capacitor fires the squib, which releases the electrolyte and activates battery B2. Thus, battery B2 now replaces battery B1 as the output and control circuit power source. Meter 41 quickly obtains the condition shown in the drawing, indicative of full power operation of the battery and uncoupling the oscillator 51 from the amplifier 52.

It is apparent that when battery B2 is first activated, there is a short period of time when the needle face 45 of meter 44 will overlie the plate 46, again coupling the oscillator 51 to amplifier 52. In the absence of special provisions, this condition could immediately energize relay 61 and cause an additional stepping of the switch 31, and this situation could repeat until all the batteries had been activated, while none had been used. Such a malfunctioning of the system is prevented, however, by using a delayed action relay for the unit 61, enabling the meter 41 to attain full movement of the pointer 44 before the relay 61 steps the switch 31 the additional time. The system therefore stabilizes with the battery B2 activated. The delayed action of relay 61 does not prevent its full operation when the battery approaches the end of its useful life, because during that phase of operation, the needle 44 attains a coupling position relative to plate 46 for as long a period of time as is necessary for the relay 61 to operate fully and step the contact 32 of switch 31 to the next terminal.

Operation of the system for activation of the succeeding batteries is the same as described above, and will therefore be apparent.

Should any one of the batteries B2 – B7 fail to respond and activate when reached by contact 32 of switch 31, it will be apparent that the energy stored in capacitor 62 will continue to activate the oscillator 51 and amplifier 52, so that eventually the switch 32 will be stepped to the next terminal. Alternatively, the contact 32 can be bridged from terminal 1 by a resistor, so that residual energy from battery B1 is always available to activate succeeding batteries and operate the control system if one battery should fail to respond.

From the foregoing description, it will be appreciated that there is provided a standby battery power supply whose life is as long as the sum of the standby lives of all the batteries used in the battery series. An exceptional standby life for the power supply is obtained by the use of reserve cell batteries in combination with a selective activation circuit which monitors the output of the activated battery. When the useful life of the activated battery approaches its end, the activation circuit substitutes the next reserve battery for the spent one, and simultaneously activates it by releasing its electrolyte to the battery electrode compartment. It is apparent that batteries other than reserve cell batteries can be employed, but the standby life will be shortened by the shelf life losses of those batteries in the supply awaiting utilization.

Many modifications and variations of the illustrated embodiment will be apparent to those skilled in the art. Accordingly such variations and modifications as are embraced by the spirit and scope of the appended claims are considered to be within the purview of the present invention.

What is claimed is:

1. A power supply comprising: a plurality of batteries; voltage monitoring means; switching means for coupling one of said plurality of batteries at a given time to said voltage monitoring means and for uncoupling said one battery coupled to said monitoring means when the output voltage of said coupled battery falls below a predetermined value and for coupling another one of said plurality of batteries, not previously coupled, to said monitoring means, whereby said batteries are sequentially coupled and uncoupled, one by one, to said monitoring means until the last one of said plurality of batteries has been coupled to said monitoring means.

2. A power supply as defined in claim 1 wherein said plurality of batteries are electrochemical reserve cell batteries.

3. A power supply as defined in claim 1 wherein power supply output terminals are coupled to said switching means in such a manner that said plurality of batteries are also sequentially coupled, one at a time, to said output terminals.

4. A power supply as defined in claim 3 wherein said switching means is a stepping switch having a plurality of terminals and each one of said plurality of batteries is connected to a different one of said terminals of said stepping switch.

5. A power supply as defined in claim 4 wherein said monitoring means comprises a meter responsive to the output voltage of the one battery of said plurality of batteries then coupled to said monitoring means and wherein a relay is coupled between said meter and said stepping switch, said relay operating said stepping switch to provide said sequential uncoupling and coupling of said batteries.

6. A power supply as defined in claim 5 wherein said meter is a capacitive switch meter and an amplifier is coupled between said meter and said relay, said amplifier providing an output to actuate said relay only when the reading of said meter falls below a predetermined level.

7. A power supply as defined in claim 6 wherein said plurality of batteries are reserve cell batteries.

8. A power supply as defined in claim 7 wherein means is provided to actuate the first one of said plurality of batteries coupled to said output terminals and means are provided for automatically actuating each battery as it is coupled to said output terminals.

9. A power supply as defined in claim 8 wherein said predetermined value of voltage at which said coupled battery is uncoupled is a voltage below the normal operating voltage of said battery.

* * * * *